(12) United States Patent
Geisberger et al.

(10) Patent No.: US 7,759,446 B2
(45) Date of Patent: Jul. 20, 2010

(54) MULTISTAGE PROCESS FOR PREPARING ORGANOPOLYSILOXANES COMPRISING AMINOALKYL GROUPS

(75) Inventors: Gilbert Geisberger, Altoetting (DE); Daniel Schildbach, Neuoetting (DE)

(73) Assignee: Wacker Chemie AG, Munich (DE)

( * ) Notice: Subject to any disclaimer, the term of this patent is extended or adjusted under 35 U.S.C. 154(b) by 51 days.

(21) Appl. No.: 12/180,728

(22) Filed: Jul. 28, 2008

(65) Prior Publication Data

US 2009/0036618 A1 Feb. 5, 2009

(30) Foreign Application Priority Data

Aug. 1, 2007 (DE) .................. 10 2007 036 069

(51) Int. Cl.
*C08G 77/00* (2006.01)
*C08G 77/04* (2006.01)
*C08G 77/06* (2006.01)
*C08G 77/16* (2006.01)
*C08F 2/00* (2006.01)

(52) U.S. Cl. .............. 528/10; 528/12; 528/14; 526/65

(58) Field of Classification Search .......... 526/65; 528/10, 12, 14
See application file for complete search history.

(56) References Cited

U.S. PATENT DOCUMENTS

| | | | | |
|---|---|---|---|---|
| 3,853,933 A * | 12/1974 | Siciliano | ............ | 556/456 |
| 4,250,290 A * | 2/1981 | Petersen | ............ | 528/14 |
| 4,551,515 A * | 11/1985 | Herberg et al. | ............ | 528/18 |
| 4,652,662 A | 3/1987 | von Au et al. | | |
| 5,077,421 A | 12/1991 | Selvig | | |
| 5,723,561 A * | 3/1998 | Braun et al. | ............ | 528/12 |
| 5,986,022 A * | 11/1999 | Austin et al. | ............ | 526/65 |
| 6,184,330 B1 * | 2/2001 | Currie et al. | ............ | 528/23 |
| 6,221,993 B1 * | 4/2001 | Currie et al. | ............ | 528/23 |
| 6,409,934 B1 * | 6/2002 | Naganawa et al. | ......... | 252/8.63 |
| 7,129,369 B2 | 10/2006 | Heller et al. | | |

FOREIGN PATENT DOCUMENTS

DE 3418358 A 11/1985
EP 1580215 A 9/2005

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

Organopolysiloxanes having aminoalkyl groups are prepared by
(i) reacting
(A) linear, cyclic or branched organopolysiloxanes with
(B) aminoalkyl silanes having an SiC-bonded hydrocarbon radical comprising basic nitrogen and 2 or 3 hydrolyzable groups, or partial or full hydrolyzates thereof,
in the presence of
(C) basic catalysts
and optionally
(D) chain-terminating reagents,
at a temperature of at least 60° C.,
then, after the reaction (i),
(ii) deactivating the catalysts (C) and
(iii) cooling the product to a temperature below 60° C. before, during or after the deactivation (ii) of the catalysts,
with the proviso that the process is performed in at least two successive stirred tanks, the reaction (i) and the cooling (iii) proceeding separately in different stirred tanks.

7 Claims, 1 Drawing Sheet

MULTISTAGE PROCESS FOR PREPARING ORGANOPOLYSILOXANES COMPRISING AMINOALKYL GROUPS

CROSS-REFERENCE TO RELATED APPLICATIONS

This application claims priority to German application No. DE 10 2007 036 069.1 filed Aug. 1, 2007.

BACKGROUND OF THE INVENTION

1. Field of the Invention

The invention relates to a process for preparing organopolysiloxanes comprising aminoalkyl groups.

2. Background Art

Organopolysiloxane oils bearing aminoalkyl groups, referred to hereinafter as "amine oils," are some of the most important organically functionalized organopolysiloxanes, and are used successfully in many different fields of application. These include textile finishing, architectural protection, cosmetic formulations, and the treatment of surfaces. In most applications in these fields, it is important to use amine oils which have a high quality.

Amine oils are usually prepared by condensation and/or equilibration reactions between linear or cyclic organopolysiloxanes and aminoalkyl-functionalized alkoxysilanes, or partial or full hydrolyzates thereof, usually under the action of catalytic amounts of basic inorganic or organic compounds.

According to the current state of the art, amine oils are prepared in a so called batchwise process, i.e. campaign by campaign in batchwise processes in stirred apparatus. A stirred apparatus is very flexible as a result of the variety of chemical reactions that can be performed therein. Batch processes, however, become uneconomical in the case of very large production campaigns and high mass throughputs. This is because, in particular, long times have to be accepted for heating and cooling and for filling and emptying of the vessels, which are several cubic meters in size, thus resulting in high operational expenditure and high labor costs.

A difficulty in current amine oil syntheses is the deactivation of the condensation or equilibration catalyst. When the basic catalyst is neutralized with an acid in a conventional manner, as described, for example, in U.S. Pat. No. 5,077,421, precipitation of salts causes turbidity. An additional filtration step is therefore required. In this batch process, this leads to longer plant occupation times.

One means of avoiding such turbidity is to deactivate the tetraalkylammonium hydroxides or ammonium phosphates and borates by thermal decomposition, after the reaction has ended, as described, for example, in U.S. Pat. No. 4,652,662 (corresponding to DE-A 3418358). However, the decomposition products thereby obtained have to be removed by distillation under reduced pressure. As a result of catalyst deactivation, higher temperatures are needed in this batch process, which leads to longer cooling times before the next batch can be run, which again in turn has the consequence of longer plant occupation time.

U.S. Pat. No. 7,129,369 (corresponding to EP-A 1580215) describes a process in which, in spite of the use of alkali metal hydroxides and alkoxides, turbidity-free amine oils are obtained without a filtration step, by neutralizing with silyl phosphates, which affords silicone-soluble neutralization products. This process is also a batch process with a long plant occupation time. Excess neutralizing agent is troublesome in the next batch after the plant has been emptied, and so the plant has to be cleaned beforehand in a time-consuming manner. If the plant is not cleaned before the next batch, either the reaction rate is slowed or a higher catalyst concentration is needed, which in this case has the consequence of poorer product quality.

SUMMARY OF THE INVENTION

It was an object of the invention to provide a process in which the abovementioned disadvantages are avoided, which is time- and energy-efficient and very economically viable, in which higher mass throughputs are achieved and the plant capacity is increased, in which organopolysiloxanes comprising aminoalkyl groups are obtained with uniformly good product properties, and in which, more particularly, the amount of catalyst used can be reduced. These and other objects are achieved through the use of two stirred tanks, cooling during or after catalyst deactivation taking place in the second stirred tank.

DETAILED DESCRIPTION OF THE PREFERRED EMBODIMENT(S)

Figure 1:
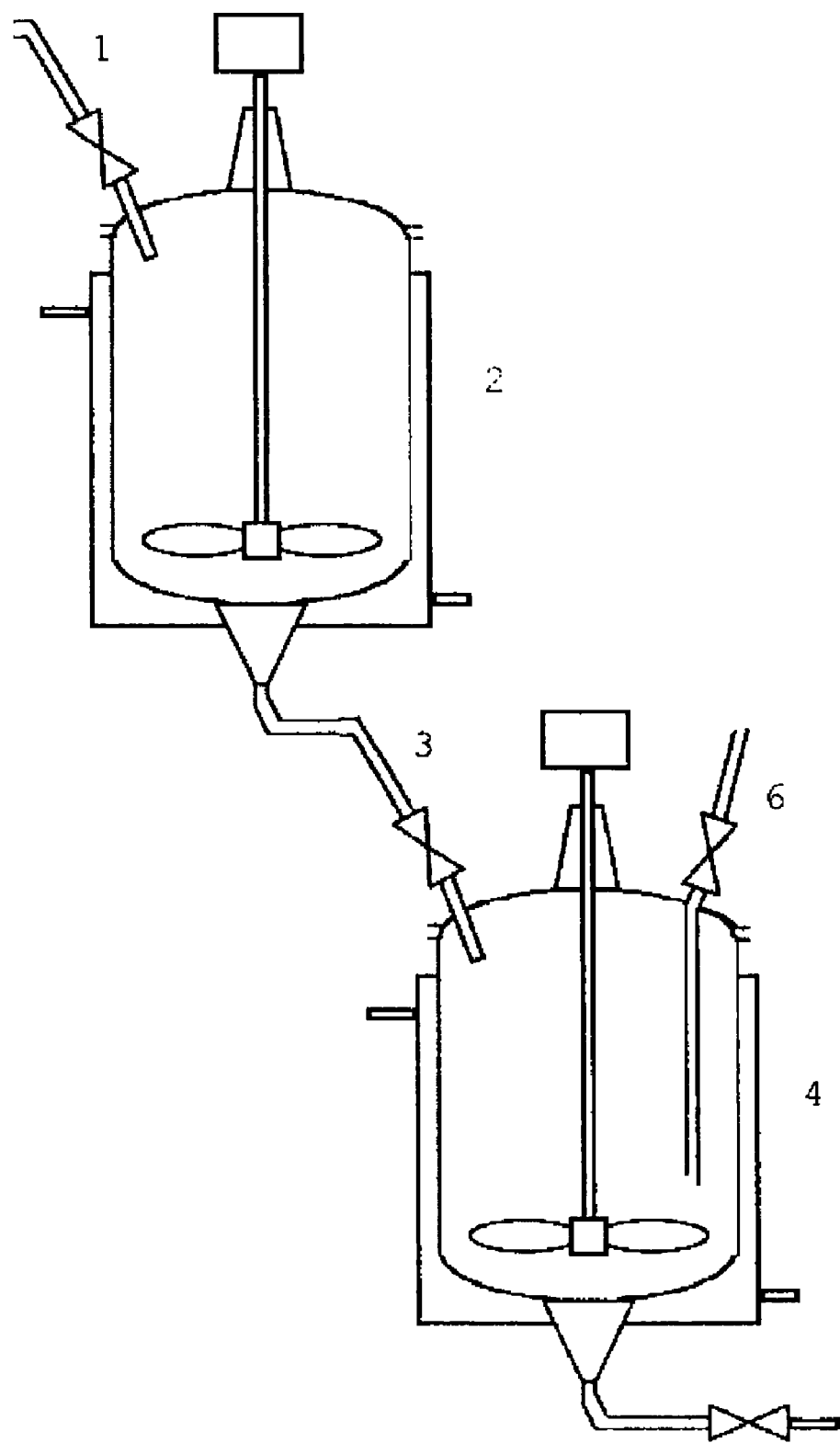
FIG. 1 illustrates one embodiment of the present invention employing two stirred tanks.

The invention thus provides a process for preparing organopolysiloxanes having aminoalkyl groups by
(i) reacting
  (A) linear, cyclic or branched organopolysiloxanes with
  (B) aminoalkyl silanes which comprise an SiC-bonded hydrocarbon radical comprising basic nitrogen and 2 or 3 hydrolyzable groups, or partial or full hydrolyzates thereof,
in the presence of
  (C) basic catalysts
and optionally in the presence of
  (D) chain-terminating reagents,
at a temperature of at least 60° C.,
then, after the reaction (i),
(ii) deactivating the basic catalysts (C) used and
(iii) cooling the reaction products to a temperature below 60° C., the cooling (iii) being effected before, during or after the deactivation (ii) of the catalysts, preferably after the deactivation (ii) of the catalysts, with the proviso that the process is performed in at least two successive stirred tanks, the reaction (i) and the cooling (iii) proceeding separately in different stirred tanks.

In the process of the invention, the deactivation (ii) can proceed either in the same stirred tank as the reaction (i) (after the reaction) or in the same stirred tank as the cooling (iii), before, during or after cooling, preferably before cooling, or in a dedicated stirred tank separately from reaction (i) and cooling (iii). Preference is given to performing the inventive process in two successive stirred tanks.

Preferably, the reaction (i) proceeds in a first stirred tank and the cooling (iii) in a downstream second stirred tank, the deactivation (ii) proceeding either in the first or in the second stirred tank, the process being carried out in such a way that, while the cooling (iii) of the reaction products proceeds in the downstream second stirred tank, the reaction (i) of the reactants newly supplied to the first stirred tank is simultaneously already proceeding in the first stirred tank.

Preferentially, the reaction (i) proceeds in a first stirred tank and the deactivation (ii) and cooling (iii) in a downstream second stirred tank, the process being carried out in such a way that, while the deactivation (ii) of the catalysts and the cooling (iii) of the reaction products proceed in the downstream second stirred tank, the reaction (i) of the reactants newly supplied to the first stirred tank is simultaneously already proceeding in the first stirred tank.

In a further embodiment, the process can also be carried out in such a way that the reaction (i) and the subsequent deactivation (ii) proceed in a first stirred tank and the cooling (iii) in a downstream second stirred tank, and, while the cooling (iii) of the reaction products proceeds in the downstream second stirred tank, the reaction (i) of the reactants newly supplied to the first stirred tank and the subsequent deactivation (ii) of the catalysts are already proceeding in the first stirred tank.

On completion of reaction (i), the catalyst (C) present in the reaction mixture is deactivated, preferably by neutralization or thermal decomposition of the basic catalyst (C). When the deactivation (ii) is effected by neutralization of the catalysts, the deactivation (ii) is preferably carried out in the downstream second stirred tank separately from the reaction (i) (which proceeds in the first stirred tank), and, when the deactivation (ii) is effected by thermal decomposition of the catalysts, the deactivation (ii) is preferably carried out in the first or second stirred tank.

In the context of the present invention, the term "organopolysiloxanes" shall encompass dimeric and oligomeric and polymeric siloxanes.

The process of the invention can be used to obtain amine oils of any possible amine number. The amine number corresponds to the number of ml of 1M HCl which are required to neutralize 1 g of substance, and is reported in millimole of amine groups per gram of substance. The amine number range is preferably between 0.001 and 12.5, preferably in the range between 0.01 and 5 and more preferably in the range between 0.1 and 3 mmol of amine groups per gram of substance.

The viscosities of the amine oils prepared by the process may be between water-mobile and solid consistency. The viscosity, always measured at 25° C., is preferably from 1 mPa·s to 10,000,000 mPa·s, more preferably from 100 mPa·s to 100,000 mPa·s, and most preferably from 500 mPa·s to 50,000 mPa·s.

The reaction (i) in the first stirred tank is preferably effected at a temperature of from 60 to 180° C., more preferably from 80 to 130° C., at which temperature deactivation (ii) can also be effected. The process can be carried out at the pressure of the surrounding atmosphere, i.e. at about 1020 hPa, but it can also be carried out at higher or lower pressures.

The deactivation can, for example, be effected by chemical reaction of the catalyst with a deactivator—usually a neutralizing agent or inhibitor. The catalysts are preferably neutralized at a temperature of from 20 to 180° C., more preferably from 60 to 130° C. The deactivation can, though, be effected by thermal decomposition of the catalyst. The thermal decomposition is preferably effected at a temperature of from 80 to 180° C., more preferably from 120 to 180° C. The deactivation by thermal decomposition of the catalyst can preferably be effected by introducing the reaction mixture into a downstream second stirred tank brought specially to the temperature needed for this purpose.

If, as a result of the reaction or the catalyst deactivation, solids are present in the reaction product delivered, they can be removed when appropriate by downstream process steps. Such downstream process steps may be a continuous filtration or a continuous extraction with a suitable solvent or a continuous adsorptive process using a suitable adsorbent.

The cooling (iii) is preferably effected preferably to a temperature of from 20 to 55° C.

The stirred tanks are preferably not cleaned (for example with solvent) each time before filling.

FIG. 1 shows a preferred embodiment of the process according to the invention. In the first step, the raw materials (A), (B), (C) and optionally (D) are metered via line (1) into the stirred tank (2). In the stirred tank (2), the reaction proceeds to give the amine oil, then the amine oil is discharged into the stirred tank (4) via line (3). In stirred tank (4), addition of the neutralizing agent via line (6) deactivates the catalyst and the product is cooled. Within the cooling time of one batch, the reaction of the next batch is already proceeding in the stirred tank (2). As soon as the amine oil has cooled sufficiently, the stirred tank (4) is emptied via line (5) and is available to cool the next charge.

The advantage of the process according to the invention is that the plant capacity is significantly increased (virtually doubled) with the same reactor volume for the reaction, by virtue of an additional stirred tank for cooling. The process is very economically viable, since the capital and operating costs are low, and since the process allows high mass throughputs. The capital costs of the cooled and stirred apparatus are much lower than for a stirred reaction tank, since the cooled and stirred tank requires significantly less periphery (no reservoir vessels with metering units, no vacuum and distillation apparatus, etc.). The operating costs are lower in the process according to the invention since the residual heat in the stirred reaction tank is utilized for the following batch. The process according to the invention is thus very energy-efficient.

It has additionally been found that, surprisingly, separation of the reaction and deactivation/cooling steps allows the catalyst concentration, and hence also the amount of neutralizing agent, to be lowered. This had a positive effect on the product properties (no turbidity, higher stability).

In a further preferred process, in which a filtration step is needed for salt removal, the stirred tank utilized for cooling is simultaneously also utilized as a reservoir vessel for the filtration. The additional filtration step which is otherwise time-consuming does not reduce the mass throughput of the overall process as a result.

The stirred tanks used in the process according to the invention may consist of glass, stainless steel, Hastelloy, or enameled steel. They preferably have a size of from 0.5 to 10 m³ and preferably a length/diameter ratio of from 0.2 to 5, more preferably from 0.5 to 2.

The stirred tanks may preferably comprise the following stirrers: propeller stirrers—usually 3 blades, shaped similar to a propeller, conveys axially; pitched blade stirrer—obliquely aligned, usually rectangular blades, conveys axially like propeller stirrers; disk stirrers—circular disk with usually 6 vertical blades arranged in an outward direction from the shaft, conveys radially; impeller stirrer—curved arms formed from tubes mounted close to the bottom, often enameled; crossbeam stirrer—pitched blade stirrer with usually 4 blades, several mounted one on top of another, especially for large stirred tanks; and anchor stirrers—conducted close to the wall. On the vessel wall, baffles may be installed. The stirrers listed here are exemplary and not limiting. Other forms of agitation may be used as well.

In the process according to the invention, the organopolysiloxanes (A) are preferably those selected from the group of linear polydiorganosiloxanes of the general formula $$HOR_2SiO(R_2SiO)_xSiR_2OH \qquad (I), \text{ and}$$

$$R_3SiO(R_2SiO)_ySiR_3 \qquad (II)$$

cyclic polydiorganosiloxanes of the general formula $$(OSiR_2)_z \tag{III}$$

and mixtures thereof, where R may be the same or different and are monovalent, optionally halogenated hydrocarbon radicals having from 1 to 18 carbon atoms, x is 0 or an integer from 1 to 800, preferably from 10 to 450, more preferably from 30 to 150, y is 0 or an integer from 1 to 800, preferably from 10 to 450, more preferably from 30 to 150, and z is an integer from 3 to 12.

Within or along the siloxane chain of the siloxanes of the above-specified formulae (I) (III), in addition to the diorganosiloxane units $R_2SiO$, it is possible for other siloxane units also to be present, which is typically not shown by such formulae. Examples of such other siloxane units, usually present only as an impurity, are those of the formulae $RSiO_{3/2}$, $R_3SiO_{1/2}$ and $SiO_2$, where R is as defined above.

In the process of the invention, the organopolysiloxanes (A) are preferably used in amounts of from 0.1 to 99.99% by weight, more preferably from 18 to 99.9% by weight, and most preferably from 51 to 99% by weight, based in each case on the total weight of the reaction mixture of (A), (B), (C) and if appropriate (D).

In the process of the invention, the aminoalkylsilanes (B) are preferably those of the general formula $$X_nR_{(3-n)}SiZ \tag{IV}$$

and partial or full hydrolyzates thereof, where

R is as defined above,

X is a hydrolyzable group selected from the group of —$OR^1$, —$NR'_2$ and —Cl, preferably —$OR^1$, $R^1$ is a monovalent alkyl radical which has from 1 to 18 carbon atoms and may be substituted by one or two ether oxygen atoms, R' is hydrogen or a monovalent hydrocarbon radical having from 1 to 18 carbon atoms, Z is a monovalent SiC-bonded hydrocarbon radical comprising basic nitrogen, and n is 2 or 3.

Examples of hydrocarbon radicals R, $R^1$ or R' are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radicals, decyl radicals such as the n-decyl radical, dodecyl radicals, such as the n-dodecyl radical, and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, - and p-tolyl radicals, xylyl radicals and ethylphenyl radicals; and aralkyl radicals such as the benzyl radical and the α- and the β-phenylethyl radicals.

The hydrocarbon radicals R, $R^1$ or R' optionally contain an aliphatic double bond. Examples are alkenyl radicals, such as the vinyl, allyl, 5-hexen-1-yl, E-4-hexen-1-yl, Z-4-hexen-1-yl, 2-(3-cyclohexenyl)ethyl and cyclododeca-4,8-dienyl radical. Preferred radicals R having an aliphatic double bond are the vinyl, allyl and 5-hexen-1-yl radicals. Preferably, however, not more than 1% of the hydrocarbon radicals R contain a double bond.

Examples of halogenated radicals R are haloalkyl radicals, such as the 3,3,3-trifluoro-n-propyl radical, the 2,2,2,2',2',2'-hexafluoroisopropyl radical, and the heptafluoroisopropyl radical, and haloaryl radicals, such as the o-, - and p-chlorophenyl radicals. The R radical is preferably a monovalent hydrocarbon radical having from 1 to 18 carbon atoms, particular preference being given to the methyl radical.

Examples of $R^1$ are $CH_3$—, $CH_3CH_2$—, $(CH_3)_2CH$—, $CH_3CH_2CH_2$—, $CH_3CH_2CH_2CH_2$—, $CH_3CH_2OCH_2CH_2$—, $CH_3CH_2OCH_2$— and $CH_3OCH_2CH_2$— radicals.

Preferably, Z in formula (IV) is a radical of the formula $$-R^2-[NR^3-R^4-]_gNR^3{}_2$$

where $R^2$ is a divalent linear or branched hydrocarbon radical having from 1 to 18 carbon atoms, $R^3$ is as defined for $R^1$ or is hydrogen or an acyl radical, preferably a hydrogen atom, $R^4$ is a divalent hydrocarbon radical having from 1 to 6 carbon atoms, and g is 0, 1, 2, 3 or 4, preferably 0 or 1.

Preferred examples of Z radicals are:
$H_2N(CH_2)_3$—,
$H_2N(CH_2)_2NH(CH_2)_3$—,
$H_2N(CH_2)_2NH(CH_2)CH(CH_3)CH_2$—,
(cyclohexyl)$NH(CH_2)_3$—,
$CH_3NH(CH_2)_3$—,
$(CH_3)_2N(CH_2)_3$—,
$CH_3CH_2NH(CH_2)_3$—,
$(CH_3CH_2)_2N(CH_2)_3$—,
$CH_3NH(CH_2)_2NH(CH_2)_3$—,
$(CH_3)_2N(CH_2)NH(CH_2)_3$—,
$CH_3CH_2NH(CH_2)_2NH(CH_2)_3$—,
$(CH_3CH_2)_2N(CH_2)_2NH(CH_2)_3$—, and the partly and fully acylated forms thereof.

Examples of aminoalkylsilanes (IV) are
(3-aminopropyl)dimethoxymethylsilane,
(3-aminopropyl)diethoxymethylsilane,
(3-aminopropyl)trimethoxysilane,
(3-aminopropyl)triethoxysilane,
[N-(2-aminoethyl)-3-aminopropyl]dimethoxymethylsilane,
[N-(2-aminoethyl)-3-aminopropyl]diethoxymethylsilane,
[N-(2-aminoethyl)-3-aminopropyl]trimethoxysilane,
[N-(2-aminoethyl)-3-aminopropyl]triethoxysilane,
(aminomethyl)dimethoxymethylsilane,
(aminomethyl)diethoxymethylsilane,
(aminomethyl)trimethoxysilane, and
(aminomethyl)triethoxysilane.

Particular preference is given to
[N-(2-aminoethyl)-3-aminopropyl]dimethoxymethylsilane,
[N-(2-aminoethyl)-3-aminopropyl]trimethoxysilane, and
(3-aminopropyl)dimethoxymethylsilane, and the cyclic and linear partial or full hydrolyzates thereof.

The aminoalkylsilane hydrolyzates (B) are preferably prepared from aminoalkyl-functional dialkoxysilanes such as (3-aminopropyl)-dimethoxymethylsilane or [N-(2-aminoethyl)-3 aminopropyl]dimethoxymethylsilane, by hydrolysis in water. The aminoalkylsilane hydrolyzates (B) used therefore preferably those of the general formula $$HO(ZRSiO)_mH \tag{VI}$$

where R and Z are each as defined above and m is an integer from 2 to 50.

Preference is given to using aminoalkylsilanes (B) or the partial or full hydrolyzates thereof in amounts of from 0.01 to 99.9%, preferably from 0.1 to 82%, and more preferably from 1 to 49%, based in each case on the total weight of the polysiloxanes (A) and, if appropriate, (D) which are used.

The basic catalysts (C) used in the process may be condensation and equilibration catalysts. The basic catalysts (C) used are preferably alkali metal or alkaline earth metal hydroxides, oxides, alkoxides or siloxanolates, which, if appropriate, are dissolved beforehand in a suitable solvent.

The catalysts (C) used may also be thermally decomposable quaternary ammonium hydroxides and phosphonium hydroxides. Examples thereof are tetramethylammonium hydroxide, benzyltriethylammonium hydroxide, tetra-n-propylammonium hydroxide, benzyldimethylethylammonium hydroxide and benzyltrimethylammonium hydroxide. Benzyltrimethylammonium hydroxide is particularly preferred. Preference is further given to using the quaternary ammonium hydroxides or phosphonium hydroxides in the form of a solution. Examples of such solvents are alcohols, e.g. methanol.

The basic catalysts (C) are preferably alkali metal hydroxides, alkali metal alkoxides, alkali metal siloxanolates and mixtures thereof. Examples of alkali metal hydroxides are potassium hydroxide and sodium hydroxide. Examples of alkali metal alkoxides are sodium methoxide and sodium ethoxide. Examples of alkali metal siloxanolates are sodium siloxanolates.

Preference is given to using potassium or sodium hydroxide, if appropriate in a methanol or water solvent, and sodium methoxide, if appropriate in a methanol solvent.

The basic catalysts (C) are preferably used in amounts of from 1 to 1000 ppm by weight, more preferably from 10 to 400 ppm by weight, and most preferably from 30 to 200 ppm by weight, based in each case on the total weight of the reaction mixture of (A), (B), (C) and if appropriate (D).

If reactive Si—OH-terminated polysiloxanes of the formula (I) are used in the process of the invention, a chain-terminating reagent (D), a so-called stopper or stopper siloxane can additionally be used. In principle, suitable compounds for this purpose are all of those which can react with Si—OH groups and are monofunctional with regard to their reactivity with Si—OH groups or can form such monofunctional groups. In addition, these chain-terminating reagents may bear further functional groups which do not react with the Si—OH groups or the aminoalkyl groups and which can be reacted in an optional further reaction of the amine oil prepared by the process according to the invention, in order to achieve additional effects.

The chain-terminating reagents (D) used in the process according to the invention are preferably those selected from the group of monoalkoxysilanes, aminoalkylmonoalkoxysilanes, linear and cyclic silazanes, alcohols, short-chain linear diorganopolysiloxanes and mixtures thereof. These include, for example, monoalkoxytrialkylsilanes, (aminoalkyl)monoalkoxydialkylsilanes, linear or cyclic silazanes, alcohols, short-chain linear polydiorganosiloxanes or mixtures thereof.

Examples of monoalkoxytrialkylsilanes are those of the formula

  (VII), and examples of (aminoalkyl)monoalkoxydialkylsilanes are those of the formula

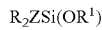  (VIII)

where R, $R^1$ and Z are each as defined above.

Examples of alcohols are those of the general formula

  (IX)

where R is as defined above,
$R^5$ may be the same or different and is a hydrogen atom or a $C_1$- to $C_{18}$-hydrocarbon radical,
$R^6$ is a $C_1$- to $C_{30}$-hydrocarbon radical or a group of the general formula —(C=O)—$R^7$ where $R^7$ is an $R^5$ radical or O—$R^5$,
l is 2, 3 or 4 and
k is 0 or an integer from 1 to 100.

Examples of short-chain linear polydiorganosiloxanes as chain-terminating reagents (D) are polydiorganosiloxanes which have short-chain terminal triorganosilyloxy groups and are of the formula

  (X), and polydiorganosiloxanes which have short-chain terminal hydroxy- or alkoxydiorganosilyloxy groups and are of the formula

  (XI)

where R is as defined above,
R" is a hydrogen atom or an $R^1$ radical,
v is 0 or an integer from 1 to 150, preferably from 30 to 100, and
w is 0 or an integer from 1 to 150, preferably from 30 to 100.

If a stopper or stopper siloxane (D) is used as a chain-terminating reagent in the process, it is preferably used in amounts of from 0.01 to 50%, more preferably from 0.05 to 30% and most preferably from 1 to 20%, based in each case on the total weight of the reaction mixture of (A), (B), (C) and (D).

The basic catalyst (C) can be deactivated by the addition of neutralizing agents (E) which form salts with the basic catalysts. Such neutralizing agents may be, for example, carboxylic acids or mineral acids. Preference is given to carboxylic acids, such as methanoic acid (formic acid), ethanoic acid (acetic acid) or propanoic acid.

The basic catalyst (C) is preferably deactivated, however, by the addition of neutralizing agents (E) which, with the basic catalysts, form salts which are soluble in the amine oils obtained and hence do not cause any turbidity whatsoever. Examples of such neutralizing agents (E) are long-chain carboxylic acids which are liquid at room temperature, such as n-octanoic acid, 2-ethylhexanoic acid, n-nonanoic acid and oleic acid, hexadecanoic and octadecanoic acid, carbonic esters such as propylene carbonate, or carboxylic anhydrides such as octenylsuccinic anhydride.

Further examples of neutralizing agents (E) which, with the basic catalysts, form salts which are soluble in the amine oils obtained and hence do not cause any turbidity whatsoever are triorganosilyl phosphates, preferably trimethylsilyl phosphates, and triorganophosphates, preferably mixtures of mono-, di- and triisotridecyl phosphates (obtainable under the name Hordaphos® MDIT from Clariant). The trimethylsilyl phosphates used are preferably compositions consisting essentially of 0-50% by weight of monosilyl phosphate of the formula: 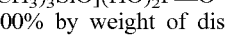
20-100% by weight of disilyl phosphate of the formula: 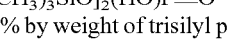
0-70% by weight of trisilyl phosphate of the formula: [(CH$_3$)$_3$SiO]$_3$P=O where the total amount is 100% by weight. The amount of neutralizing agents (E) needed depends on the amount of basic catalysts (C) used and is preferably from 0.05 to 0.50%, more preferably from 0.15 to 0.30%, based in each case on the total weight of the reaction mixture composed of (A), (B), (C) and if appropriate (D). The neutralization can be effected before or after the cooling of the reaction mixture.

When ammonium hydroxides or phosphonium hydroxides are used as catalysts (C), the deactivation is effected by thermal decomposition.

The organopolysiloxanes (amine oils) having aminoalkyl groups obtained by the process of the invention preferably have a residual volatility of less than 4% by weight, more preferably less than 2% by weight, and most preferably less than 1% by weight. The residual volatility is a thermally determined value and is defined as the amount of volatile constituents in % by weight when a 5 g sample is heated at 120° C. over a time of 60 min (120° C./5 g/60 min). A majority of the volatile constituents comprises cyclic siloxanes, octamethyltetrasiloxane (D4) being present in addition to higher cycles.

A particularly preferred embodiment of the inventive process affords amine oils having exceptionally low residual volatilities, preferably less than 2%, more preferably less than 1% by weight, combined with particularly short average reaction times, preferably between 1 and 50 minutes, without any need to apply to the reactor a reduced pressure relative to the atmospheric pressure surrounding the reactor. In this particularly preferred embodiment of the process according to the invention, the aminoalkylsilanes (B) used are partial and full hydrolyzates of the aminoalkylsilanes (B), preferably aminoalkylsilane hydrolyzates of the formula (VI). In this process, preference is given to using organopolysiloxanes (A) of the formulae (I) and/or (II) together with the aminoalkylsilane hydrolyzates (B), preferably of the formula (VI).

The process according to the invention preferably affords organopolysiloxanes which have aminoalkyl groups and are of the general formula $$(R^8O)_q R_{3-q} SiO(ZRSiO)_o (R_2SiO)_p SiR_{3-q}(OR^8)_q \quad (XII)$$

where R and Z are each as defined above,
$R^8$ is a hydrogen atom or $R^1$,
o is an integer from 1 to 1000, preferably from 2 to 260,
p is an integer from 0 to 2500, preferably from 50 to 650, and
q is 0 or 1.

The organopolysiloxanes which have aminoalkyl groups and are obtained by the process according to the invention can be used, inter alia, as compositions for the treatment of porous or nonporous, absorptive or nonabsorptive substrates, such as leather, webs, cellulosic materials (pulp and paper), textiles, nonwovens and tissues, natural and synthetic fibers, glasses and ceramics, porous mineral building materials, construction coatings and wood, and as a constituent of polishes and coating materials for, for example, coated and uncoated metals, plastics and laminates, and the treatment with the organopolysiloxanes which bear aminoalkyl groups imparts key properties such as water repellency and/or a soft hand to the substrates described. Furthermore, the organopolysiloxanes which bear aminoalkyl groups can be used, inter alia, as a constituent of antifoam formulations, for paper sizing and the coating of gypsum plasterboard, as care compositions for coated and uncoated metals, plastics, laminates, vulcanized and unvulcanized rubbers, as dispersants, as wetting agents, as release agents or auxiliaries, as paint additives, as PU foam stabilizers and, in the personal hygiene sector, as active ingredients in hair conditioners, hair shampoos and skincare compositions. The organopolysiloxanes which bear aminoalkyl groups can, when dissolved in organic solvents or dispersed in water, preferably be used in the form of aqueous emulsions.

The organopolysiloxanes which bear aminoalkyl groups can be used in the free amine form or in salt form, for example in the form of the ammonium chloride salt or ammonium carboxylate salt, by addition of hydrochloric acid or the corresponding carboxylic acid. Compositions which comprise the organopolysiloxanes which bear aminoalkyl groups and are obtained by the process according to the invention may comprise further ingredients, such as surfactants, thickeners, rheology-modifying additives, perfumes, waxes, plasticizers, detergents, lubricant oils, electrolytes, aromas, biocides or active pharmaceutical or cosmetic ingredients.

Example 1

Process in 2 Successive Stirred Tanks

In a heatable 15 l stirred apparatus (stirred apparatus 1), a mixture of 11,032 g of an OH-terminal polydimethylsiloxane having a viscosity of 80 mPa·s at 25° C., 321.1 g of N-[(aminoethyl)aminopropyl]dimethoxymethylsilane and 228.0 g of diethylene glycol monobutyl ether was admixed with stirring with 11.6 g of a solution of potassium hydroxide in methanol (20%). After sampling and analytical determination of the KOH content, a value of 201 ppm by weight of KOH was obtained.

Under a nitrogen atmosphere, the mixture was heated to 85° C. at 100 mbar. This distilled out methanol present in the reaction mixture. On attainment of 85° C., temperature and reduced pressure were maintained until there was no further viscosity rise. After 120 minutes at 85° C., the contents of stirred apparatus 1 were discharged into a second 15 l stirred apparatus (stirred apparatus 2), such that stirred apparatus 1 was available for the next batch after a total of three hours of occupation time.

While neutralization was effected in stirred apparatus 2 with stirring with 15.4 g of a mixture of trimethylsilyl phosphates of composition
3% by weight of mono(trimethylsilyl) phosphate,
74% by weight of bis(trimethylsilyl) phosphate and
23% by weight of tris(trimethylsilyl) phosphate, stirred apparatus 1 was filled again with reactants as described above.

After sampling from stirred apparatus 1 and analytical determination of the KOH content, a value of 202 ppm of KOH was obtained this time. The reaction in stirred apparatus 1 was begun again.

After cooling to approx. 50° C., the contents of stirred apparatus 2 were emptied into a product vessel. Subsequently, the contents of stirred apparatus 1, after the reaction had ended, were discharged again into stirred apparatus 2 for neutralization and, after cooling, emptied into a product vessel.

Product campaign 1: colorless oil, viscosity of 1354 mPa·s at 25° C., turbidity-free [turbidity measurement (instrument: TA6-FS, manufacturer: Galvanic Applied Sciences Inc.) gave a value of 0 ppm].

Product campaign 2: colorless oil, viscosity of 1343 mPa·s at 25° C., turbidity-free [turbidity measurement (instrument: TA6-FS, manufacturer: Galvanic Applied Sciences Inc.) gave a value of 1 ppm].

Comparative Experiment

Process in a Stirred Tank

A mixture of 11,032 g of an OH-terminal polydimethylsiloxane having a viscosity of 80 mPa·s at 25° C., 321.1 g of N-[(aminoethyl)aminopropyl]-dimethoxymethylsilane and 228.0 g of diethylene glycol monobutyl ether was admixed with stirring with 11.6 g of a solution of potassium hydroxide in methanol (20%). After sampling and analytical determination of the KOH content, a value of 201 ppm by weight of KOH was obtained.

Under a nitrogen atmosphere, the mixture was heated to 85° C. at 100 mbar. This distilled out methanol present in the reaction mixture. On attainment of 85° C., temperature and reduced pressure were maintained until there was no further viscosity rise. After 120 minutes, neutralization is effected with 15.4 g of a mixture of trimethylsilyl phosphates of the composition of example 1 and the neutralized mixture is cooled to room temperature.

After emptying, the stirred apparatus was available for the next batch only after a total of 5.5 hours, compared to example 1.

The resulting colorless oil had a viscosity of 1364 mPa·s at 25° C. and was turbidity-free; a turbidity measurement (instrument from example 1) gave a value of 0 ppm.

Without cleaning the reaction vessel after emptying it, 11,032 g of the OH-terminal polydimethylsiloxane, 321.1 g of N-[(aminoethyl)aminopropyl]-dimethoxymethylsilane, 228.0 g of diethylene glycol monobutyl ether and 11.6 g of a solution of potassium hydroxide in methanol (20%) were weighed in for a second test campaign, and the mixture was stirred at room temperature for 15 min. After sampling and analytical determination of the KOH content, a value of 188 ppm by weight of KOH was obtained this time. The test was continued and ended by the procedure described above.

The resulting colorless oil had a viscosity of 1180 mPa·s at 25° C. and was not turbidity-free; the turbidity measurement gave a value of 21 ppm this time.

Example 2

In a heatable 15 l stirred apparatus (stirred apparatus 1), a mixture of 11,032 g of an OH-terminal polydimethylsiloxane having a viscosity of 80 mPa·s at 25° C. and 321.1 g of N-[(aminoethyl)aminopropyl]dimethoxymethylsilane was admixed with stirring with 2.32 g of benzyltrimethylammonium hydroxide. Under a nitrogen atmosphere, the mixture was heated to 85° C. at 250 mbar and the reaction mixture was stirred under these conditions for 60 min.

Subsequently, the contents of stirred apparatus 1 were discharged into a second 15 l stirred apparatus preheated to 170° C. (stirred apparatus 2). While the catalyst was deactivated at 20 mbar with stirring in stirred apparatus 2 on attainment of 150° C., stirred apparatus 1 was filled again with reactants as described above and the reaction was begun again.

After cooling to approx. 50° C., the contents of stirred apparatus 2 were emptied into a product vessel. Subsequently, the contents of stirred apparatus 1, after the reaction had ended, were discharged again into stirred apparatus 2 to deactivate the catalyst and, after cooling, emptied into a product vessel.

Product campaign 1: colorless oil, viscosity of 1080 mPa·s at 25° C., turbidity-free [turbidity measurement (instrument TA6-FS, manufacturer: Galvanic Applied Sciences Inc.) gave a value of 0 ppm].

Product campaign 2: colorless oil, viscosity of 1091 mPa·s at 25° C., turbidity-free [turbidity measurement (instrument TA6-FS, manufacturer: Galvanic Applied Sciences Inc.) gave a value of 0 ppm].

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A batch process for preparing organopolysiloxanes having aminoalkyl groups comprising
   (i) reacting at a temperature of at least 60° C.,
      (A) at least one organopolysiloxane selected from the group consisting of linear organopolysiloxanes with
      (B) aminoalkylsilanes which comprise at least one SiC-bonded hydrocarbon radical comprising basic nitrogen, and 2 or 3 hydrolyzable groups,
      or partial or full hydrolyzates thereof,
   in the presence of
      (C) basic catalysts, and
      (D) optionally in the presence of chain-terminating reagents,
   then, after the reaction (i),
   (ii) deactivating the basic catalyst(s) (C) and
   (iii) cooling the reaction products to a temperature below 60° C., the cooling (iii) being effected before, during or after the deactivation (ii) of the catalysts,
   with the proviso that the process is performed in at least two successive stirred tanks, the reaction (i) and the cooling (iii) proceeding separately in different stirred tanks wherein the reaction (i) is carried out in a first stirred tank and the deactivation (ii) and cooling (iii) in a downstream second stirred tank, with the further proviso that, while the deactivation (ii) and the cooling (iii) proceed in the second stirred tank, the reaction (i) of reactants newly supplied to the first stirred tank is simultaneously proceeding in the first stirred tank.

2. The process of claim 1, wherein the deactivation (ii) proceeds in the same stirred tank as the reaction (i), in the same stirred tank as the cooling (iii), or in a dedicated stirred tank separately from the reaction (i) and the cooling (iii).

3. The process of claim 1, wherein the cooling (iii) proceeds after the deactivation (ii).

4. The process of claim 1, wherein the reaction (i) proceeds in a first stirred tank and the cooling (iii) in a downstream second stirred tank, the deactivation (ii) proceeding either in the first or in the second stirred tank, with the proviso that, while the cooling (iii) proceeds in the second stirred tank, the reaction (i) of the reactants newly supplied to the first stirred tank is simultaneously proceeding in the first stirred tank.

5. The process of claim 1, wherein the reaction (i) is performed at a temperature of from 60 to 180° C.

6. The process of claim 1, wherein the cooling (iii) is effected to a temperature of from 20 to 55° C.

7. The process of claim 1, wherein the deactivation (ii) is effected by neutralization or thermal decomposition of the basic catalyst(s) (C).

* * * * *